United States Patent [19]
Murata et al.

[11] Patent Number: 6,118,925
[45] Date of Patent: Sep. 12, 2000

[54] METHOD OF AND SYSTEM FOR CONFIRMING PROGRAM MATERIALS TO BE BROADCASTED AND THEN BROADCASTING THE PROGRAM MATERIALS, AND RECORDING MEDIUM HAVING RECORDED THEREIN A PROCEDURE FOR IMPLEMENTING THE METHOD

[75] Inventors: Shigeyuki Murata, Kodaira; Hirotada Ueda, Kokubunji, both of Japan

[73] Assignee: Hitachi Denshi Kabushiki Kaisha, Tokyo, Japan

[21] Appl. No.: 08/747,726

[22] Filed: Nov. 12, 1996

[30] Foreign Application Priority Data

Nov. 14, 1995 [JP] Japan ................................ 7-295857

[51] Int. Cl.$^7$ .................................................. H04N 5/91
[52] U.S. Cl. ................................ 386/83; 386/55; 386/46
[58] Field of Search ................................... 386/1, 45–46, 386/70, 95, 83, 125–126, 52, 55; 348/722; H04N 5/91

[56] References Cited

U.S. PATENT DOCUMENTS

| | | | |
|---|---|---|---|
| 4,949,187 | 8/1990 | Cohen ..................................... | 358/335 |
| 5,083,860 | 1/1992 | Miyatake et al. ....................... | 352/129 |
| 5,177,513 | 1/1993 | Saito . | |
| 5,307,456 | 4/1994 | MacKay ................................. | 395/154 |
| 5,339,393 | 8/1994 | Duffy et al. ............................ | 395/161 |
| 5,353,121 | 10/1994 | Young et al. ........................... | 348/563 |
| 5,418,622 | 5/1995 | Takeuchi ................................ | 358/335 |
| 5,434,678 | 7/1995 | Abecassis .............................. | 358/342 |
| 5,457,499 | 10/1995 | Lim ....................................... | 348/474 |
| 5,532,833 | 7/1996 | Hong et al. ............................. | 358/335 |
| 5,537,528 | 7/1996 | Takahashi et al. ..................... | 395/154 |
| 5,541,738 | 7/1996 | Mankovitz ............................. | 358/335 |
| 5,552,837 | 9/1996 | Mankovitz ............................. | 348/734 |
| 5,568,275 | 10/1996 | Norton et al. ......................... | 386/52 |
| 5,613,032 | 3/1997 | Cruz et al. ............................. | 386/69 |

FOREIGN PATENT DOCUMENTS

| | | |
|---|---|---|
| 0113993 | 7/1984 | European Pat. Off. . |
| 0289986 | 11/1988 | European Pat. Off. . |
| 0338753 | 10/1989 | European Pat. Off. . |
| 0590759 | 4/1994 | European Pat. Off. . |
| 0595619 | 5/1994 | European Pat. Off. . |
| 4-111181 | 4/1992 | Japan . |
| 4-117686 | 4/1992 | Japan . |
| 2296601 | 7/1996 | United Kingdom . |
| 93/21635 | 10/1993 | WIPO . |
| 94/11995 | 5/1994 | WIPO . |

OTHER PUBLICATIONS

Tonomura, Content Oriented Visual Int. Using Video Icons for Dat. Sys., Aced. Pr. Lim., pp. 183–198, Jan. 1990.

*Primary Examiner*—Wendy Garber
*Assistant Examiner*—Vincent F. Boccio
*Attorney, Agent, or Firm*—Antonelli, Terry, Stout & Kraus, LLP

[57] ABSTRACT

A method of recording material data of a broadcasting program and displaying its content includes the steps of storing data of a plurality of program materials each having an identification code allotted thereto in a first memory device, extracting one or a plurality of image data representative of the material from the image data of the material for each of the program materials, arranging data of the representative images of each of the program materials in association with the arranged identification code in the sequence of a broadcasting time and storing the data in a second memory device, and reading out the data of the representative images of the program materials from the second memory device on the basis of the identification codes and displaying the data read out on a display.

12 Claims, 9 Drawing Sheets

FIG. 6

BROADCASTING MANAGEMENT 1995-11-15 (WED)
(CHARACTER SCREEN)

| GATHERING TIME | GATHERING SEQUENCE | GATHERING TIME PERIOD | MATERIAL NO. | GATHERING ID | SPONSOR | PROGRAM CONTENT |
|---|---|---|---|---|---|---|
| PROGRAM TIME | | | | | | |
| 06:00 01 | | 01:30 | 06001123 | | | |
| 00:30 | | | 000006 | | ○□ COMPANY | DRAMA "ABC" |
| 00:30 | | | 000004 | | ○× COMPANY | SPORTS "FG" |
| 00:30 | | | 000007 | | □× COMPANY | MOVIE "HIJK" |
| 06:00 02 | | 02:30 | 06022123 | | | |
| 00:30 | | | 000004 | | ○× COMPANY | SPORTS "FG" |
| 00:30 | | | 000005 | | □△ COMPANY | NEWS "DE" |
| 00:30 | | | 000006 | | ○□ COMPANY | DRAMA "ABC" |
| 00:30 | | | 000004 | | ○× COMPANY | SPORTS "FG" |
| 00:30 | | | 000007 | | □× COMPANY | MOVIE "HIJK" |
| 06:05 03 | | 01:30 | 06051234 | | | |
| 00:30 | | | 000005 | | □△ COMPANY | NEWS "DE" |
| 00:30 | | | 000004 | | ○× COMPANY | SPORTS "FG" |
| 00:30 | | | 000007 | | □× COMPANY | MOVIE "HIJK" |
| 06:07 04 | | 02:30 | 06051234 | | | |
| 00:30 | | | 000004 | | ○× COMPANY | SPORTS "FG" |
| 00:30 | | | 000005 | | □△ COMPANY | NEWS "DE" |
| 00:30 | | | 000006 | | ○□ COMPANY | DRAMA "FG" |
| 00:30 | | | 000004 | | ○× COMPANY | SPORTS "FG" |
| 00:30 | | | 000007 | | □× COMPANY | MOVIE "HIJK" |
| 06:10 05 | | 01:30 | 06051267 | | | |
| 00:30 | | | 000005 | | □△ COMPANY | NEWS "DE" |
| 00:30 | | | 000004 | | ○× COMPANY | SPORTS "FG" |

REPRESENTATIVE IMAGE SCREEN — 83
CUT LIST — 84
82
80

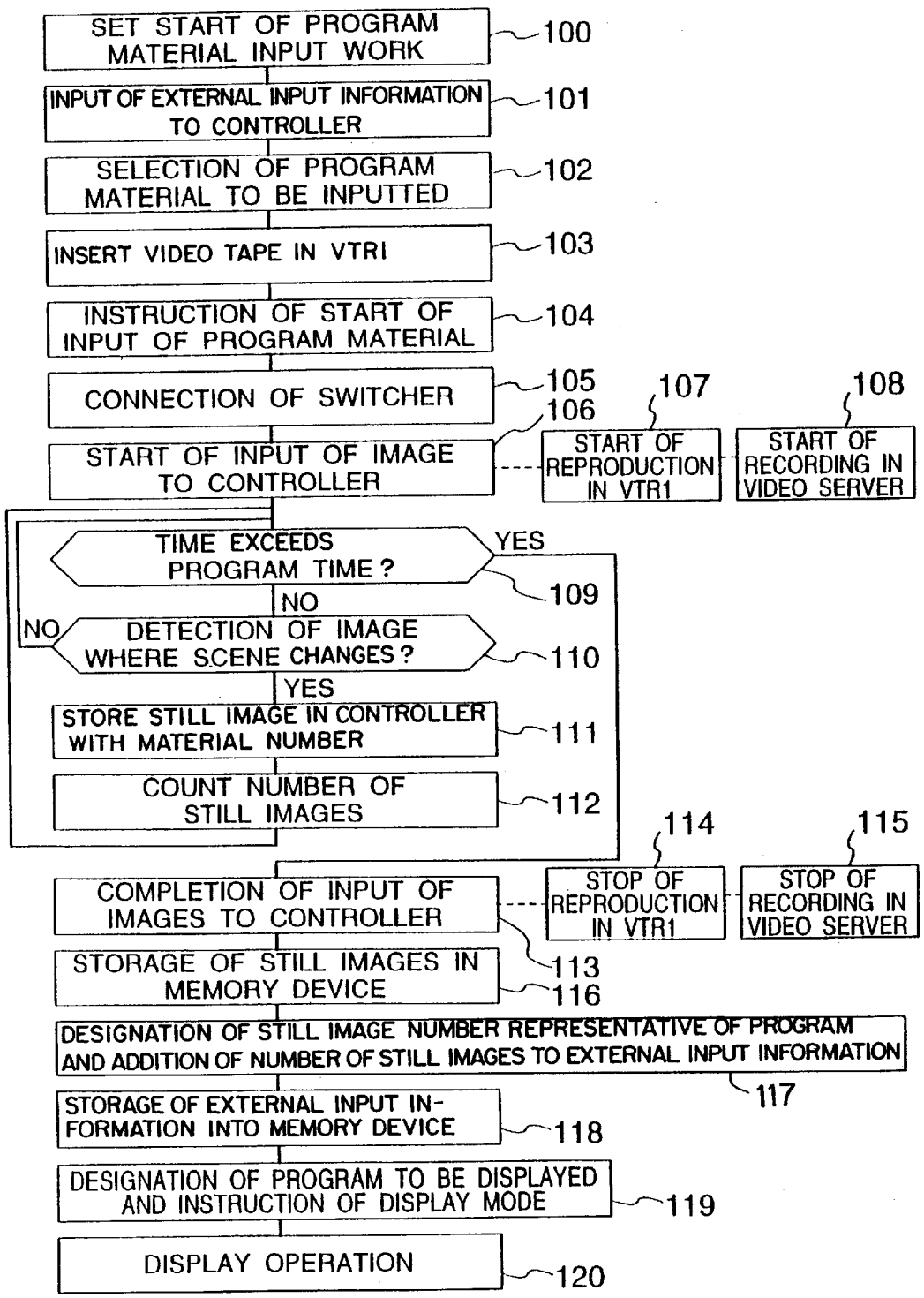

FIG.8

MATERIAL MANAGEMENT (CHARACTER SCREEN)   1995-11-15 (WED) 06:00:19

| MATERIAL NO. | SPONSOR | PROGRAM CONTENT | PROGRAM TIME |
|---|---|---|---|
| 000004 | ○× COMPANY | SPORTS "FG" | 00:30 |
| 000005 | □△ COMPANY | NEWS "DE" | 00:30 |
| 000006 | ○○ COMPANY | DRAMA "ABC" | 00:30 |
| 000007 | □× COMPANY | MOVIE "HIJK" | 00:30 |

85 — REGISTRATION

CM REGISTRATION

[ CHANGE ]~90   [ ERASE ]

| REGISTRATION | MATERIAL NO. | SPONSOR | CM CONTENT |
|---|---|---|---|
| REGISTERED | 000012300003 | HT COMPANY | WORD PROCESSOR |
| REGISTERED | 000012300001 | HT COMPANY | VIDEO TAPE RECORDER |
| REGISTERED | 000012300005 | HT COMPANY | WASHING MACHINE |
| REGISTERED | 000012100001 | HT COMPANY | AIR CONDITIONER |
| REGISTERED | 000012100002 | FAST MOTORS | CAR |
| REGISTERED | 000012100012 | SAFE MOTORS | CAR |
| REGISTERED | 000012100013 | ABC COSMETICS | PERFUME |
| REGISTERED | 000011300001 | EFG CHEMICALS | BATH SALT |
| REGISTERED | 000011300002 | YUM FOODS | INSTANT NOODLE |
| REGISTERED | 000011300003 | PQR COMPANY | TOY |
| REGISTERED | 000011300004 | BLK COMPANY | TELEVISION SET |
| REGISTERED | 000011300005 | HT COMPANY | VIDEO CAMERA |
| UN-REGISTERED | 000012100003 | HT COMPANY | PERSONAL COMPUTER |

91

[ REGISTRATION ]~92

METHOD OF AND SYSTEM FOR CONFIRMING PROGRAM MATERIALS TO BE BROADCASTED AND THEN BROADCASTING THE PROGRAM MATERIALS, AND RECORDING MEDIUM HAVING RECORDED THEREIN A PROCEDURE FOR IMPLEMENTING THE METHOD

BACKGROUND OF THE INVENTION

This invention relates to a system which directly reads out material data such as image data from a random access type memory device storing the image data in a succession quite unrelated a series of broadcasting sequences, and uses the image data for broadcasting. More particularly, this invention relates to a method which makes it possible to visually confirm whether or not a broadcasting sequence is appropriate or whether or not image signals, etc, are appropriately stored in the memory device described above, by using still image information of program materials, and to a system for executing such a method.

Program broadcasting equipment which stores image signals, etc, for each program material by using a random-accessible memory device such as a video disk, a semiconductor memory, or the like, reproduces the image data such as image signals from the memory device in a well-timed manner for an edited sequence of a program, and records the image data such as image signals in another memory medium such as a video tape called an "unified tape", has been employed in recent years. Here, the term "unified tape" means a video tape recording thereon each program material with editorial order in accordance with the broadcasting sequence. To confirm the edited content of the program in such a moving picture editing equipment at the time of the edition work, a method is known which extracts a representative frame image of each cut from image signals of dynamic images stored in each cut unit, and displays a list of the extracted representative frame images. An editor corrects information of a reproduction sequence of each cut while watching the list displayed on the moving picture editing apparatus. For Example, Japanese Patent Application Laid-open No. JP-A-4-117686 discloses an invention entitled "Moving Picture Editing Apparatus".

When recorded programs are broadcasted, the broadcasting sequence of the programs generally are extremely important and if any error occurs in the sequence of the programs so broadcasted, the influences of such an error on the broadcasting station are unfathomable. According to the prior art method, therefore, a unified tape is generated above all. This unified tape is generally previewed before broadcasting of the programs so as to confirm whether or not the sequence of the recorded programs is correct and whether or not any quality problem exists in the images of the reproduced programs. Thereafter, the image signals, etc, reproduced from the unified tape so confirmed is broadcasted at the time of program broadcasting.

In the method of broadcasting the programs according to the prior art described above, the still images are arranged and displayed on the basis of reproduction sequence information which is edited, at the time of the edition work of editing the programs before the unified tape is produced, and the editor can easily confirm or preview the edition result and quality of the image signals stored in the random access type memory device. However, in order to re-confirm the sequence of the programs edited into the unified tape and the contents of the programs after the reproduction sequence information is edited and the unified tape is produced but before the start of broadcasting of the programs, or to confirm image quality of the programs reproduced from the unified tape, the confirmation items described above must be checked for each reproduced image with eye watching while the unified tape is being reproduced, and an extremely long time is necessary.

Furthermore, the unified tape cannot be produced unless all the necessary program materials are stored into the memory device.

SUMMARY OF THE INVENTION

It is therefore an object of the present invention to make it possible to confirm the broadcasting sequence of a series of programs and the contents of representative still images of the programs without producing an unified tape by integrating program reproduction sequence information so that it can be used at the time of confirmation of the edition content and at the time of broadcasting.

It is another object of the present invention to eliminate confirmation of quality of all the images of the unified tape and to remove an elongated tape reproduction time that has been necessary in the past for confirmation.

It is still another object of the present invention to make a confirmation work of a program broadcasting sequence before, and during, broadcasting of the programs easy.

It is still another object of the present invention to confirm any omission of those programs which are listed up in a reproduction sequence information but have still to be stored in a video server, by the absence of still images displayed.

A method of recording material data of a broadcasting program and displaying its content according to the present invention comprises the steps of storing data of a plurality of program materials each having an identification code allotted thereto in a first memory device, extracting one or a plurality of image data representative of the program material from the image data of the material data for each of the program materials, arranging data of the extracted representative images of each of the program materials in association with the identification code of corresponding material in the sequence of a broadcasting and storing the data in a second memory device, and reading out the data of the representative images of the program material from the second memory device on the basis of the identification code and displaying the data by a display device.

Further, a system for recording materials of a broadcasting program and displaying its content comprises recording/reproduction apparatuses for recording and reproducing the broadcasting program materials, a control unit for processing various kinds of information inputted in accordance with a predetermined control program and controlling the operation of the system as a whole, an input unit for inputting the information of broadcasting programs inclusive of the information of a broadcasting time of each program to the control unit, a display for displaying the data outputted from the control unit, a first memory device for storing the image data outputted from the recording/reproduction apparatus, and a second memory device for storing data reproduced by the control unit, wherein the control unit includes a unit for allotting identification codes to a plurality of program material, and a unit for extracting the data of representative images of each program material from the image data of the program materials for each program material, and the control unit outputs the data of the representative images of each of the program materials in association with the identification code to the second memory device, reads out the data of the representative image of the program material on the basis of the identification code from the second memory device, and outputs the representative image to the display.

According to the embodiment of the present invention, in the first place the program materials recorded on a memory medium such as a video tape are stored in a memory device capable of reading them by a random access system, such as a video disk of a video server or the like. At this time, the memory address of each program material to be stored in the video disk is stored in association with the material number (identification code) of the program materials.

When, or after, the program materials are stored, the change of the scene of the image signals is detected for each program material on the basis of the image signals reproduced from the video disk. Each scene is then divided on the basis of the change which is the detection result, and one still image representative of the image content of each divided scene is selected for each scene. When one representative image is selected in this way, the image information of the still image that represents each selected scene is stored as the information corresponding to the image for each program material in order to display one image representing the image content instead of reproducing all the image signals stored in the video disk. At this time, the image information of the still image for each program material is stored in association with the material number of the program material and with the scene sequence number for each material.

To make it possible to confirm transition of the content of the scene for each image from the image information of the still image so stored, the still image representative of each scene is aligned and displayed on one screen in the sequence corresponding to the scene sequence number of each scene for each scene. Each program material has naturally different scenes from another, and has in many cases similar or exactly the same scene. Therefore, the contents of the program materials can be confirmed extremely easily by displaying in the list form the still images representative of the image contents of the respective scenes for each program material.

According to another embodiment of the present invention, one still image information among the still image information for each image signal displayed on the one screen is set as the representative still image information for representing each image signal. The representative still image information set in this way and the representative still information of each image signal in accordance with the broadcasting sequence are aligned and displayed. The representative still image is so set as to represent the content of one characterizing scene in the image signals for each program material, and these representative still images are aligned and displayed in accordance with the broadcasting sequence. In this way, whether or not any broadcasting problem as to the broadcasting sequence of the program materials can be confirmed. At the same time, those program materials which are listed up in the broadcasting sequence information and are not yet stored in the video disk can be confirmed extremely easily because their still image information are not stored and hence, are not displayed, either.

According to the method of the present invention, further, a plurality of still images aligned in the sequence corresponding to the sequence of each scene for each image signal are realigned in the sequence corresponding to a predetermined broadcasting sequence and are displayed on the monitor on the basis of a plurality of still image information for each image signal stored and the broadcasting sequence information stored previously. According to this arrangement, it becomes possible to confirm those problems in the broadcasting sequence among the program materials which cannot be detected by the method described above, that merely aligns and displays the representative still images, such as when the broadcasting sequence becomes the problem by the comparison of a scene with another, or when the content of a scene not representing the subject matter of a program material and not set as the representative scene renders the problem of the broadcasting sequence.

According to the method of the present invention, further, when a plurality of image signals stored are being broadcasted in a predetermined broadcasting sequence, the representative still image having a subsequent broadcasting sequence from the image signal that are now on-air and corresponding to the image signals not yet broadcasted is displayed. In the case of an emergent change of a program, etc, therefore, the program material to be broadcasted in succession to the program material which is now on-air can be confirmed.

Furthermore, the present invention provides a recording medium which stores a procedure for recording aforementioned material data of broadcasting programs and displaying the contents of the data. The procedure used for computer-aided control of the system implementing aforementioned method of the present invention can be read out suitably from this recording medium. A method of aforementioned procedure also can be recorded in this recording medium in conformity with various configuration.

BRIEF DESCRIPTION OF THE DRAWINGS

FIG. 6 shows an example of a display screen for displaying a list of information on a broadcasting program;

FIG. 7 is a flowchart of a method of recording materials of a broadcasting program under the assistance of a computer and displaying the content according to the present invention;

FIG. 8 shows an example of a display screen of a list of information on program materials of an external input information; and FIG. 9 shows an example of registered information screen of materials of commercial message images.

DESCRIPTION OF THE PREFERRED EMBODIMENTS

Hereinafter, preferred embodiments of the present invention will be explained in detail with reference to the accompanying drawings.

Figure 5:
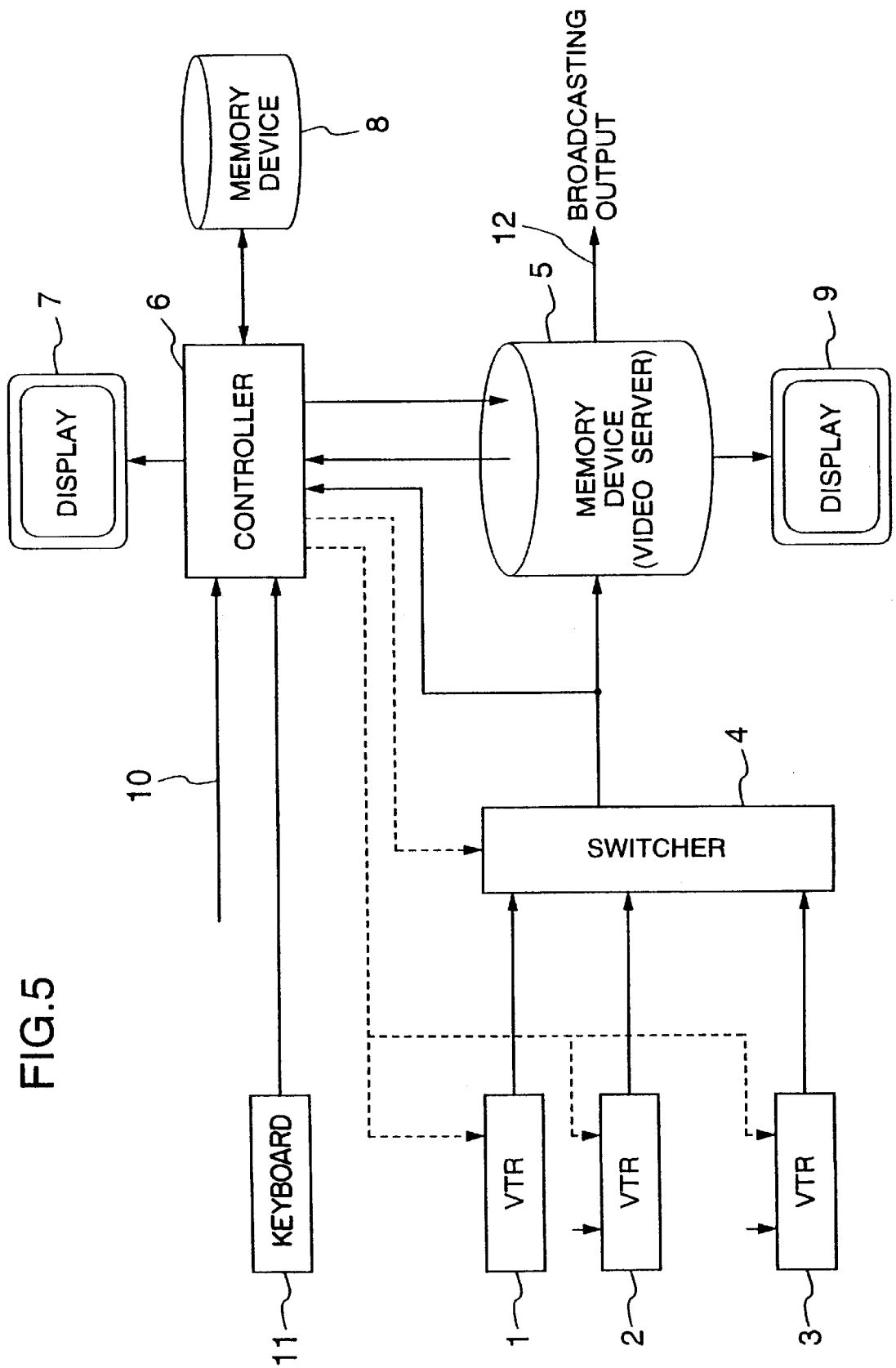
FIG. 5 is a block diagram of a system for recording materials of a broadcasting program under the assistance of a computer and displaying the content according to the present invention.

FIG. 5 is a block diagram showing an example of a system for recording materials of a broadcasting program under the assistance of a computer and displaying their contents.

In FIG. 5, reference numerals 1, 2 and 3 denote means for reproducing image signals from a recording medium recording thereon program materials, such as video tape recorder (VTR). Reference numeral 4 denotes a switcher to which the image signals from the VTRs 1 to 3 are inputted and which selectively outputs one of these image signals. Reference numeral 5 denotes a recording unit (video server) capable of recording and reproducing the image signals and sound signals by a random access system, and it comprises a magnetic disk, for example. Reference numeral 6 denotes a controller which controls each part of the program broadcasting system and to which input information 10 is inputted from outside. Reference numeral 7 denotes a display device for displaying various information from the controller 6, reference numeral 8 denotes a memory device for storing the control information and the input information used by the controller 6, and reference numeral 9 denotes a display for displaying the images by the image signals and the sound signals from the video server 5. Reference numeral 11 denotes a keyboard through which an operator applies command information to the controller 6.

The controller 6 includes a memory (not shown) storing therein a control program, a central processing unit 8 (not shown) and another memory (not shown) capable of temporarily storing the input information and outputting it. The controller 6 controls the operations of peripheral devices connected thereto in accordance with the control program, and further processes the input information and outputs the result. The controller 6 stores the control program of the flowchart of FIG. 7 which will be later described in detail, for example, and functions in such a manner that the operation described by the flowchart can be executed.

Figure 1:
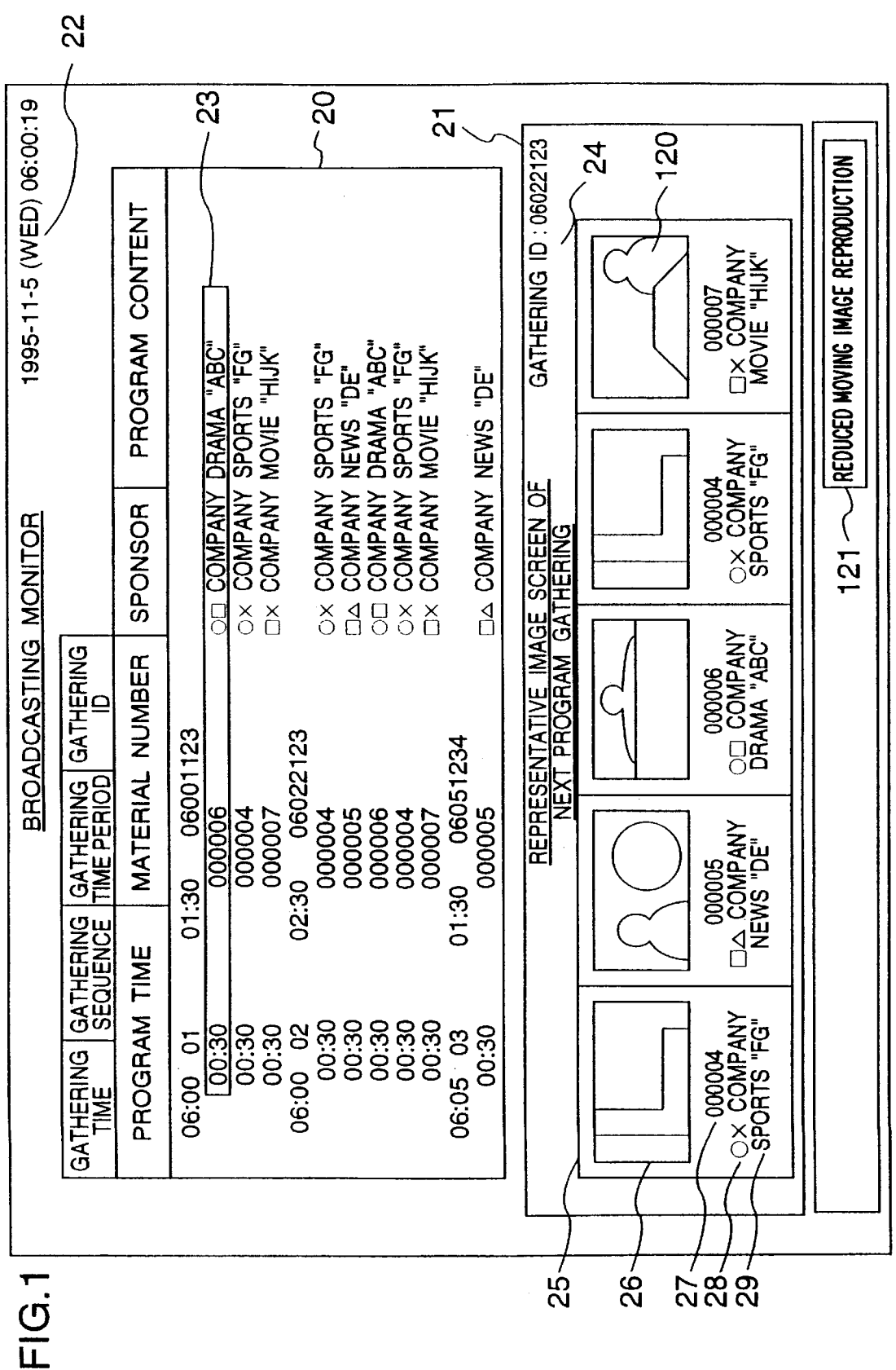
FIG. 1 shows an example of a display screen for displaying altogether a list of information on broadcasting programs and representative images of program materials on one screen.

The external input information 10 inputted from outside to the controller 6 is outputted from the controller 6 and is inputted to the memory device 8. This external input information 10 is the information for each program material such as (1) a program time representing the broadcasting time of the program, (2) a material number, (3) a program sponsor, (4) a program content describing the content of the program, and so forth. As an example of the information for each program, the information such as the program time, the material number, the program sponsor and the program content as represented by 00:30, 000006, ○ □ company and the drama "ABC" as represented by marking 23 in FIG. 1, are stored. The program broadcasting list, for example, is inputted as a program broadcasting sequence information. In this program broadcasting list, there is the case where a series of a program group aligned in accordance with the broadcasting sequence are handled dividedly as broadcasting program gatherings. Hereinafter, this broadcasting program gathering will be simply called the "program gathering".

The information contained in the program broadcasting list inputted to the controller 6 include, for example, (5) a program gathering time at which broadcasting of the program gathering is started, (6) a program gathering sequence representing the broadcasting sequence of the program gathering, (7) a program gathering period representing the broadcasting time period of the program gathering, (8) a program gathering ID for identifying each program gathering and (9) a material number of a program broadcasted for each program gathering, and these informations are listed up in the broadcasting sequence for each program gathering.

On the other hand, the program materials recorded on the video tape are reproduced by any of the VTRs 1 to 3. The image signals so reproduced are inputted to the video server 5 and to the controller 6 through the switcher 4. At this time, the operator inputs the identification number corresponding to the reproduced program material, such as the material number, with tapping at the keyboard 11 to the controller 6. The video server 5 outputs to the controller 6 the memory address information representing at which place the image signal is stored inside the video server 5. The controller 6 relates the inputted material number with the memory address information and outputs this relation information to the memory device 8, and the memory device 8 stores this information.

The reproduced image of the program material sent from any of the VTRs 1 to 3 is inputted further to the controller 6 through the switcher 4. Each program material includes generally a plurality of scenes. In the case of a news program, for example, the program material includes the scene of the title at the start of the news program, the scene of an announcer as a news caster, the scene of the site of a certain happening, the scene of the live from field report of another news, and so forth. The controller 6 extracts the image in which the scene changes, from the reproduced images of the VTR. The extraction of the images in which the scene changes can be executed by using a technology entitled "Detection Method of Change Point of Moving Images" disclosed in Japanese Patent Application laid-open No. JP-A-4-111181 which detects the change point of scenes by searching a change ratio of a correlation coefficient of a feature quantity between adjacent frame images, for example.

The program material can be divided into a plurality of scenes at a boundary between adjacent pictures in which the scene changes by more than a predetermined amount. The controller 6 selects a frame image (still image) representative of the image of each scene for a plurality of these scenes. Generally, the first frame image of each scene is selected as a representative still image. Extraction of a scene change picture and selection of a representative scene are operated in accordance with the control program of the controller 6.

The information quantity, for example, of the representative still image so selected is thinned out and the image information is data-compressed by the controller 6 to reduce the information quantity. The still image information compressed in this way is related with its material number for each program material, and is further related with the sequence information (scene sequence number) of the scene for each corresponding program material. Thereafter, this information is stored in the memory device 8.

As a result of the operations described above, the images of the representative scenes of each program material are stored in the memory device 8, and all the program materials necessary for broadcasting are stored in the video server 5.

Next, the operations of the system for recording the materials of the broadcasting programs and displaying their contents under the assistance of a computer, explained above, will be explained in further detail with reference to the flowchart of FIG. 7.

First, a start of the program material inputting work (registration operation) is set at the step 100. The input information 10 is inputted from outside to the controller 6 at the step 101. The list tabulating the information 10 regarding the inputted program materials in the sequence of the broadcasting is displayed on the screen of display 7. In this list, the input information 10 is assorted in accordance with each program material and is displayed in the arrangement as shown in FIG. 6. The operator sets the pointer to the display position of the desired program material in the list on the screen at the step 102. The operator sets the video cassette recording the program material, which is to be registered, to the VTR1 at the step 103 at which the program material to be registered is designated. The controller 6 gives a command to start the operation of the program material registration at the step 104. The switcher 4 connects the output of the VTR1 to the inputs of the controller 6 and the video server 5 at the step 105. The steps 106, 107 and 108 are strated simultaneously. The controller 6 inputs the reproduced images from the VTR1 at the step 106. The reproduction operation of the video tape by the VTR1 is conducted at the step 107. The reproduced images from the VTR1 are recorded by the video server 5 at the step 108. Whether or not the program materials to be registered are all incorporated is checked by conducting counting up to the required time of the program at the step 109. The image in which the scene changes is extracted at the step 110 by using the method of detecting the change point of the moving images described in JP-A-4-111181. That is, the extracted image has a scene change by more than a predetermined amount between adjacent pictures. Material numbers corresponding program materials are allotted to all the images having the scene change and so extracted, as the representative still images, and these images are aligned in the sequence of the broadcasting and are temporarily stored in the memory inside the controller 6, at the step 111. The number of representative images of the scenes stored in the controller 6 (frame number) is counted up at each program material at the step 112. The subsequent steps 113, 114 and 115 are executed simultaneously. Namely, the controller 6 finishes the input operation of the reproduced images from the VTR1 at the step 113. The video tape reproduction operation by the VTR1 stops at the step 114. The recording operation to the video server 5 stops at the step 115. The representative still images are read out from the memory of the controller 6 and are stored in the memory device 8 at the step 116. One still image representative of the program is designated from among a plurality of representative still images. Generally, the typical image of the scene having the first scene change is designated as the representative image of the program. Further, the number of representative still images to be registered is added to the input information 10 at the step 117. By the way, designation of the program representative image can be redesignated. The additional input information is inputted to the memory device 8 at the step 118. The registration operation of one program material is completed by a series of operations described above. At this point, a display representing that registration is finished is applied to the program material registered, in the screen of the registered information list of the program material (see FIG. 9). When the program representative image is to be redesignated, a pointer is set to a button display 90 for the designation change of the representative image of the screen shown in FIG. 9 so as to instruct the designation change. The scene representative images of the program material registered to the memory device 8 are serially displayed at the upper right corner 91 of the screen. When the desired still image is displayed at this upper right corner 91, the pointer is set to the registration button 92 so as to register the scene representative image as the program representative still image.

Figure 2:
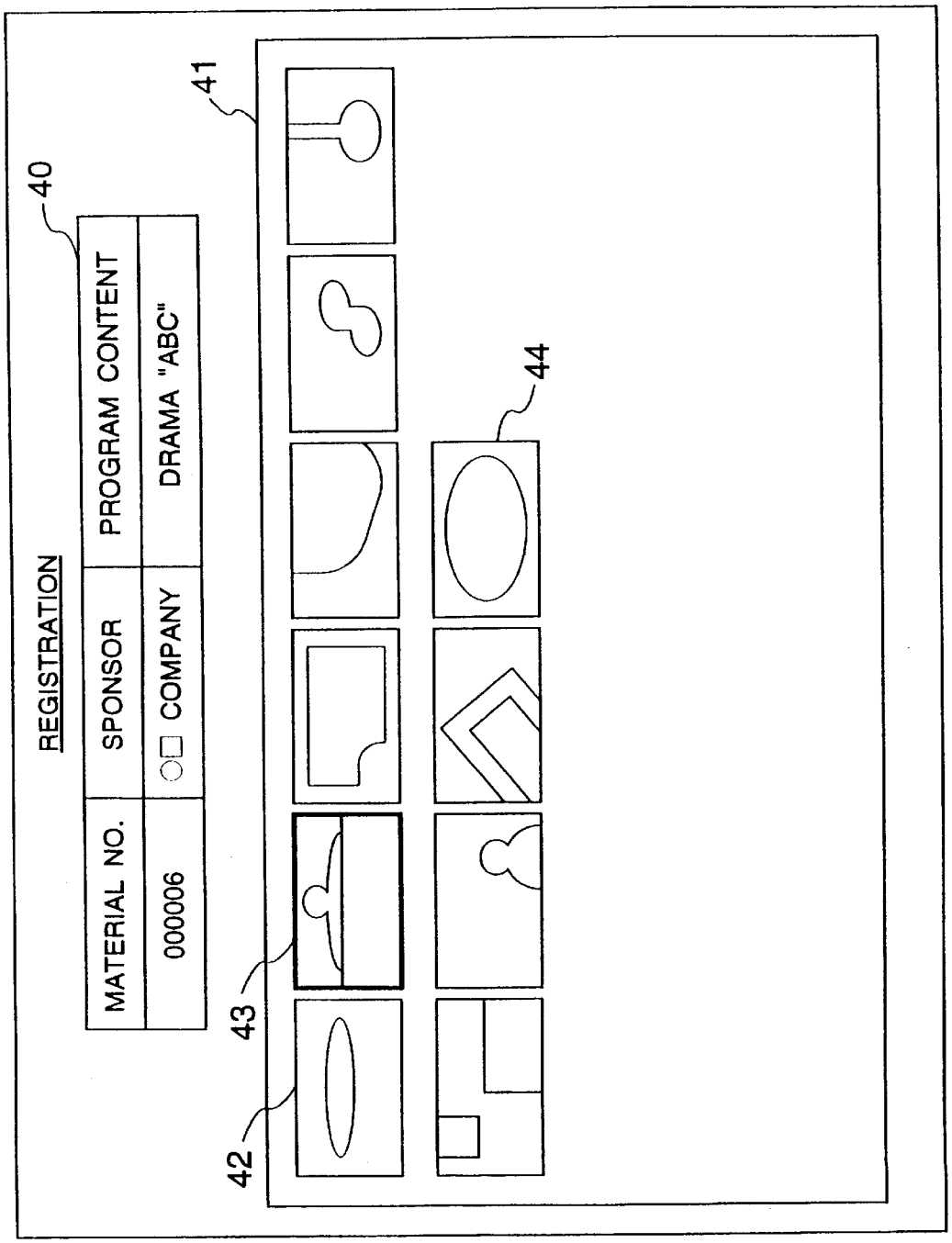
FIG. 2 shows an example of a display screen for displaying images of representative scenes in one program in the sequence of a broadcasting.
Figure 3:
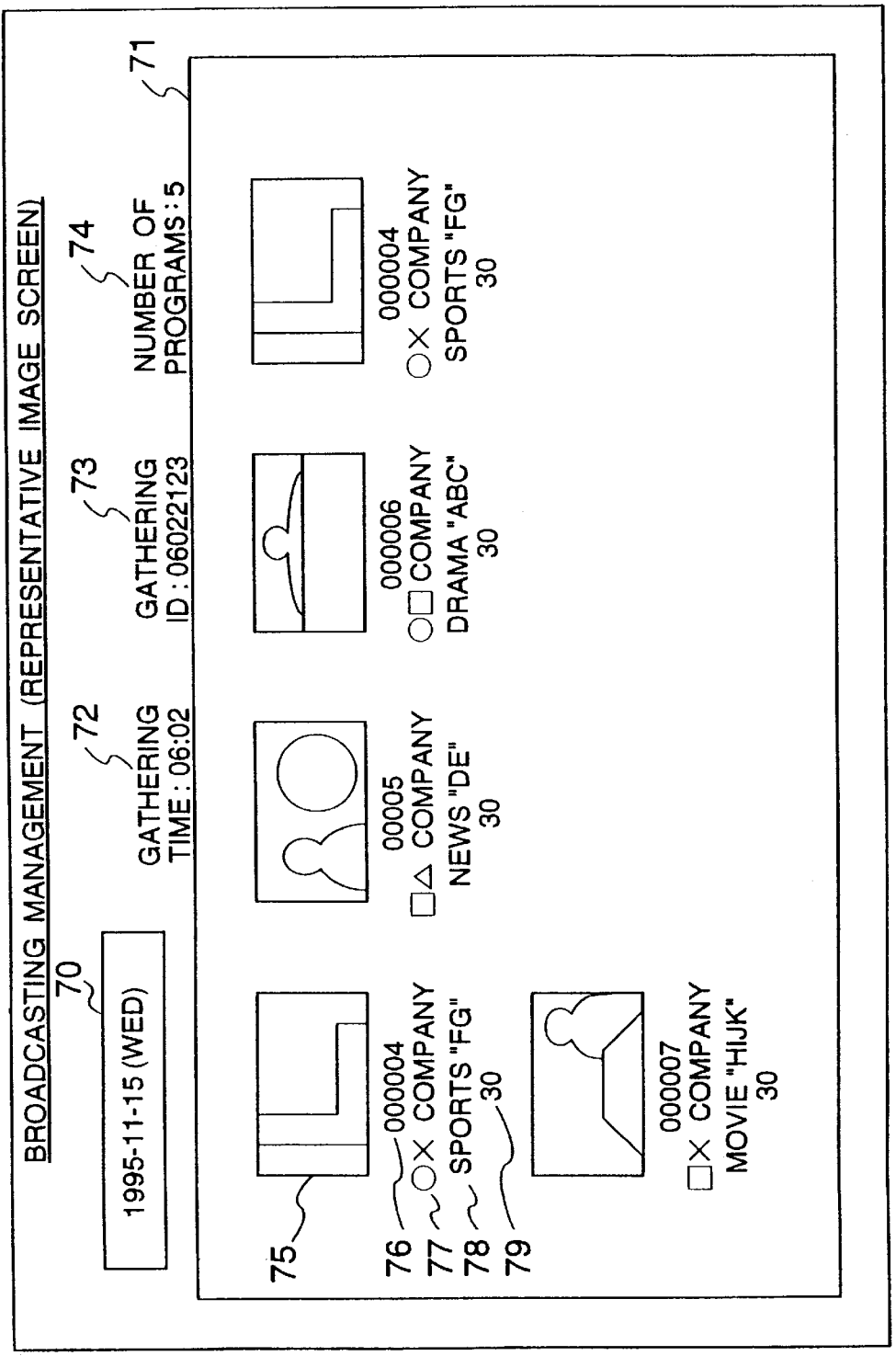
FIG. 3 shows an example of a display screen for displaying representative images representative of a plurality of broadcasting programs in the sequence of a broadcasting.
Figure 4:
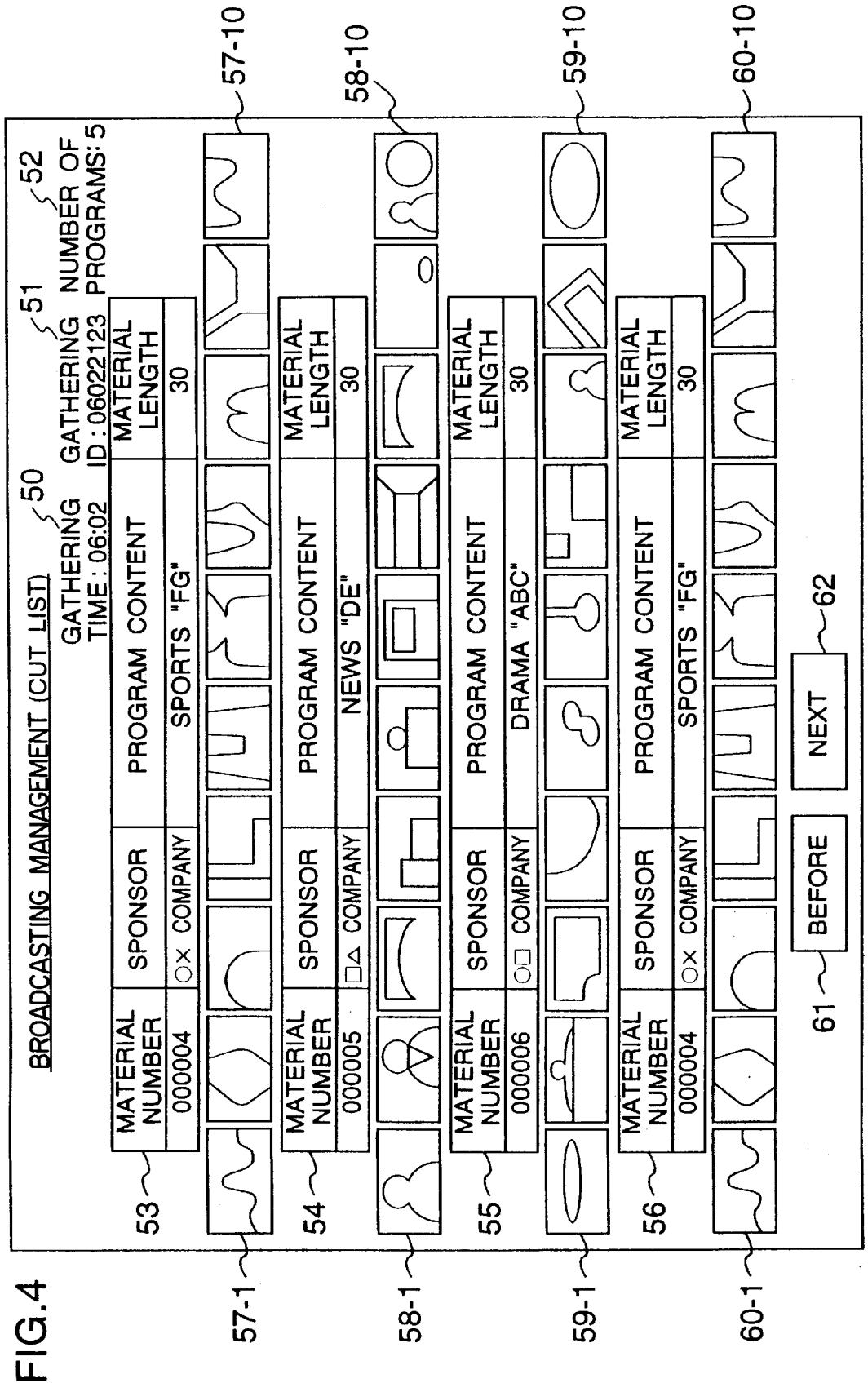
FIG. 4 shows an example of a display screen for displaying representative scenes of a plurality of broadcasting programs in the sequence of a broadcasting.

Next, the operation of displaying the scene representative image of each program material registered and the program representative image on the display device 7 will be explained. The display screen shown in FIG. 6 is displayed at the step 119, and the kind of the program material and the display image to be displayed is designated by the pointer 82. For example, when the button 83 designated as "representative image screen" is designated, the screen of FIG. 1, which will be explained below, is displayed, and when the button 84 designated as "cut list", the screen shown in FIG. 4 is displayed at the step 120, respectively. Further, the display screen of the list of the external input information shown in FIG. 8 is displayed, and when the button 85 designated as "registration" is pointed by the pointer 82, the screen shown in FIG. 2 is displayed. Further, the screen shown in FIG. 3 is displayed by designating the area of the gathering information of the screen in FIG. 6 as will be explained later. In the screen shown in FIG. 3, the representative images of all the programs inside the program gathering are arranged and displayed in the sequence of the broadcasting. Incidentally, in the flowchart of FIG. 7, the steps 118 and 119 are depicted as the continuous steps. However, the program material registration operation of the steps 100 to 118 and the display operation of the program material information of the steps 119 and 120 are mutually independent, and both operations need not be always conducted continuously.

Next, the method of displaying whether or not quality of the content of the program material so registered and its sequence of broadcasting are appropriate will be explained.

First, the content of the program broadcasting list stored in the memory device 8 is altogether displayed as shown in FIG. 6. In this drawing, reference numeral 80 denotes a display area for displaying a part of the program list. In the display area 80, the gathering time, the gathering sequence, the gathering ID, the program time, the material number, the program sponsor and the program content are aligned and are altogether displayed for each gathering and for each program material. The program content for each gathering can be switched to the display for confirmation by using the still image. This confirmation can be attained by selecting the display portion of the gathering information, which is displayed in the display area 80, of the gathering whose content is desired to be confirmed, by using the pointer. Then, the display is switched to the screen in which the still images are aligned as shown in FIG. 3. This drawing represents the case where a gathering having the gathering sequence of 02 and the gathering ID of 06022123 is selected, and the representative still images for each of the five programs inside the gathering are displayed.

Because the present invention makes it possible to switch the screen display shown in FIGS. 6 and 3, the present invention can quickly confirm the content of each program material, though the detail of the display content shown in FIG. 3 will be described later. Because the present invention makes it also possible to switch the display screen to the screen shown in the later-appearing FIG. 2, which depicts an example of the display screen for displaying the representative images of the scenes of each program material in the broadcasting sequence, besides the screen display shown in FIG. 3, it becomes possible to monitor in more detail the relationship between the program broadcasting list and the program content, and to confirm whether or not program broadcasting is correct.

Next, the display method for displaying the content of the program broadcasting list and the content of the program material in association with each other, particularly the display method which can confirm the program material scheduled to be broadcasted in succession to the program material which is being broadcasted, will be explained with reference to FIG. 1.

FIG. 1 shows an example of the screen display of the display device 7 which displays the content of the program broadcasting list and the content of the program material in association with each other, according to the present invention. In FIG. 1, reference numeral 20 denotes the display area for displaying a part of the program broadcasting list, reference numeral 21 denotes the display area for displaying the representative still images for each program material of the program gathering scheduled to be broadcasted (next gathering) in succession to the program gathering to which the program material which is now on the air belongs, and reference numeral 22 denotes the broadcasting time display of the present broadcasting.

In the display area 20, the gathering time, the gathering in succession sequence, the gathering ID, the program time, the material number, the program sponsor and the program content are aligned and displayed altogether for each gathering and for each program material. Making 23 is applied to the program material which is now on the air as shown in FIG. 1, and represents that the program material is on the air.

In the display area 21, on the other hand, the gathering ID 24 and the group 25 of the representative still images of the program material of the next gathering described above are displayed. A text display is added to each representative still image. For example, the material number 27, the program sponsor 28 and the program content 29 which constitute the text display are displayed for the still image 26.

To display the images of FIG. 1, the controller 6 reads out the material numbers of all the programs of the next program gathering to the program gathering which is on the air at present and the representative image numbers of the material numbers from the input information 10 in the program broadcasting list. The controller 6 makes the access to the data file of the material numbers so read out from the data file stored in the memory 8, reads out the program representative still images corresponding to the representative image numbers, and holds them in the memory of the controller 6. The program representative still images corresponding to the representative image numbers of all the programs of the next program gathering are read out from the memory of the controller 6 and are displayed as the screen 21 in FIG. 1 on the display device 7.

The operator can check in advance the content of the broadcasting program of the next gathering by monitoring the display screen shown in FIG. 1. Therefore, when the operator comes to realize any error of the program material or disturbance of image quality before broadcasting of the program by monitoring the display screen of FIG. 1, the operator can take emergency measures such as the display of a character message reading "Please wait for a while" or emergency images that are prepared beforehand.

Because the program content of the next gathering is displayed during broadcasting according to the arrangement described above, a unified tape becomes unnecessary. Even when counter-measures for an emergent program change depends on the preview of the program material scheduled to be broadcasted next in succession to the program material which is now on-air, an appropriate measure can be decided quickly.

Next, the display method which can extremely easily preview the content of the program material by displaying altogether the still images representative of the image content of each scene for each program material in the sequence of the scenes will be explained with reference to FIG. 2.

FIG. 2 shows an example of the screen display of the display device 7 which displays the content of the program material according to the present invention. In this drawing, reference numeral 40 denotes a text information display relating with the program material, and the material number of the selected program material, the program sponsor and the program content are displayed. These information are read out from the memory device 8 under the control of the controller 6 and are outputted to, and displayed by, the display device 7.

Reference numeral 41 denotes a display area for displaying the still images representative of each scene of the program material. In this display area 41, the still images of the selected program material are read out in the same way as described above and are displayed. In the example shown in the drawing, the still images are serially aligned from the left to the right in accordance with the scene sequence such as the still image 42 corresponding to the first scene and displayed at the uppermost left position and then the still image 43 corresponding to the second scene. Six still images are displayed on one row or stage in this example and when the still images in one row become full, the next still image is displayed at the extreme left position of the next stage below the former. One to a predetermined number of still images can be displayed in the display area 41, and maximum twenty-four still images can be displayed in the example shown in FIG. 2. Incidentally, the number of still images displayed is different depending on the number of the scene for each program material. In FIG. 2, ten images from the still image 42 to the still image 44 are displayed.

Incidentally, the still image 43 is displayed as the display example when it is set as the representative still image representative of the program material, and its image is marked by a thick frame.

The program materials have naturally different scenes and in many cases, have similar scenes and entirely the same scene. Therefore, when the program material is stored in the video server, etc, the preview of the content of the program material can be made extremely easily by displaying altogether the still images representing the image content of each scene for each program material in the scene sequence.

The external input information on the material content recorded in the video server 5 are read out from the recording device 8 and are displayed as shown in FIG. 8. In this drawing, reference numeral 100 denotes a display area for displaying a part of the external input information. In this display area 100, the material number, the program sponsor, the program content and the program time are displayed in the list form. To switch the screen to the representative image of one program material, display portion of the program material whose content is desired to be previewed is selected by manipulating the mouse or the keyboard from among the external input information displayed in the display area 100. Subsequently, when the button 85 of "registration" in the screen of FIG. 8 is selected by the operation of the mouse or the keyboard, the still image is displayed in the display area 41 for displaying the still image representative of each scene of the program material in FIG. 2. The still images 42 to 44 representative of each scene of the program material is displayed when the controller 6 reads out the material number selected from the external information 10, finds out the still image file having the same name as that of the material number from the data file of the memory device 8 and outputs the still images in the data file to the display device 7.

As the still images of one program material are displayed in this way as shown in FIG. 2, the content of one program material can be promptly previewed when it is desired to preview the content of one program material or to confirm whether or not the data which manages the material corresponds to the material content, without the necessity for reproducing the material of the program and watching it in the course of the whole program time.

Next, the display method which can confirm any problem of the broadcasting sequence between the program materials by so setting the representative still images as to represent one characterizing scene in the image signals of each program material and aligning and displaying the content in accordance with the broadcasting sequence will be explained with reference to FIG. 3.

FIG. 3 shows another example of the display which displays the content of the program broadcasting list and the content of the program material for each gathering. In the drawing, reference numeral 70 denotes the display of the broadcasting date based on the program broadcasting list and reference numeral 71 denotes the display area for displaying the representative still images of each program material in the frame selected gathering the program broadcasting list. Reference numeral 72 denotes the program gathering time, reference numeral 73 denotes the program gathering ID and reference numeral 74 denotes the program number in the program gathering.

The representative still images representative of each program material of the selected gathering are regularly aligned and displayed in the display area 71 in accordance with the broadcasting sequence.

The content of the program broadcasting list is displayed in the list form shown in FIG. 6 at the display step 119. In FIG. 6, reference numeral 80 denotes the display area for displaying a part of the program list. In this display area 80 are displayed the gathering time, the gathering sequence, the gathering ID, the program time, the material number, the program sponsor and the program content in the list form for each gathering and for each program material. Further, the display screen can be switched to the display screen shown in FIG. 3 for previewing the program content for each gathering by using the still images. This switching method is as follows. First, the display portion of the gathering information displayed in the display area 80 of the gathering the content of which is desired to be previewed is selected by the operation of the mouse or the keyboard. Next, the "representative image screen" button of the screen shown in FIG. 6 is selected by the operation of the mouse or the keyboard and in this way, the representative still images representative of the program material inside the gathering shown in FIG. 3 are arranged and displayed in accordance with the broadcasting sequence. FIG. 3 shows the example where the program gathering having the gathering sequence of No. 02 and the gathering ID of 06022123 is selected, and the representative images of the five programs inside the gathering are displayed. The still images representative of the program materials inside the gathering are displayed as the controller 6 reads the material number and the representative image number of its program material in the broadcasting sequence from the external input information 10, finds out the still image file having the same name as that of the material number from the information inside the memory device 8, reads the still image of the representative image number and outputs it to the display device 7. When the screen shown in FIG. 3 is displayed in this way, whether or not any problem of the broadcasting sequence of the program material exists can be quickly previewed. Here, the term "problem of the broadcasting sequence" means an inappropriate broadcasting sequence such as casting of the advertisement of foodstuffs after casting of the advertisement of toilet chemicals, casting of the advertisement of a wedding hall after casting of the advertisement of a cemetery park, etc.

By the way, the representative still image described above is generated when the controller 6 sets one still image for each program material from among the still images for each scene as a representative still image representative of each program material. This set operation sets the still image representative of the first scene as the representative still image of the program material at the time of the scene detection, for example. Further, the operator can select and set in addition another still image representative of the program material by applying the instruction from the keyboard 11 or from the pointer moving on the display screen shown in FIG. 3.

In the case of the example shown in FIG. 3, the representative still image 75 of the program material first broadcasted is displayed at the uppermost left position in the display area 71, and the next representative still image is displayed on the right side adjacent to the former in accordance with the broadcasting sequence. When the upper stage is filled, the next representative still image et seq are similarly aligned and displayed from the extreme left position of the next stage.

The text display is added to each representative still image so that the content of each program material can be grasped more easily. For example, the program sponsor 76, the program content 77, the material number 78 and the program time 79 which constituted the text display are displayed for the representative still image 75.

According to the display method described above, the representative still image is so set as to express the content of one characterizing scene among the image signals for each program material, and these representative still images are aligned and displayed in accordance with the broadcasting sequence. In this way, any problem of broadcasting in the broadcasting sequence among the program materials can be previewed. At the same time, there is the case where the program materials listed up in the broadcasting sequence information and inputted to the video server 5 cannot be used because the images contain the noise. Although such materials must not be kept storing to the video server 5, the operator is likely to forget to take away such materials in an emergency. When pre-viewing is made by using the still image representative of the program even in such a case, pre-viewing can be made extremely easily because the boundary between noisy portion and normal image portion is detected as a scene change and the representative still image of noisy portion is displayed for example spots or fully dark.

Next, the display method which can preview the problem when the broadcasting sequence becomes the problem by the comparison of one scene with another or when the problem of the broadcasting sequence becomes the problem depending on the content of the scenes not set as the representative image and not representing the subject matter of the program material will be explained with reference to FIG. 4.

FIG. 4 shows another example of the screen display of the display device 7 which displays the content of the program broadcasting list and the content of the program material for each program gathering according to the present invention. In FIG. 4, reference numerals 50, 51 and 52 indicate program gathering time, program gathering ID and number of programs in the program gathering, respectively.

Reference numeral 53 denotes the text information display relating to be the program material which is first broadcasted in that program gathering, and the material number of the program material, the program sponsor, the program content and the material length are displayed. Reference numerals 54, 55 and 56 denote the text information displays relating to the program materials similarly broadcasted in the second, third and fourth places, respectively.

A series of the still images 57-1 to 57-10 corresponding to the program material are displayed below the text display of each program material such as the text display 53. Similarly, the still images 58-1 to 58-10, the still images 59-1 to 59-10 and the still images 60-1 to 60-10 are displayed below the text displays 54, 55 and 56, respectively.

The operation of the still image display inside the program gathering of the program broadcasting list will be explained in further detail. The content of the program broadcasting is displayed in the list form as shown in FIG. 6. Here, the display can be switched to the display for previewing the content of the program for each program gathering by using the still image. To switch the display in this instance, the display portion of the program gathering information displayed in the display area 110 of the program gathering the content of which is desired to previewed is selected by operating the mouse or keyboard. The still images of the program materials inside the program gathering shown in FIG. 4 are displayed in accordance with the broadcasting sequence when the "cut list" button 84 of the screen shown in FIG. 6 is selected by operating the mouse or the keyboard. The still image of the program material inside the program gathering is displayed when the controller 6 reads the material number in the broadcasting sequence inside the selected program gathering, finds out the still image file having the same name as that of the material number from the information preserved by the memory device 8, reads the still image having the representative image number and outputs it to the display device 7. When FIG. 4 is displayed in this way, the problem of the broadcasting sequence of the program material, if any, can be reliably previewed. The problem of the broadcasting sequence of the program material can be quickly previewed by the still image representative of the program of FIG. 3. If the program is doubted as being inappropriate for broadcasting if it is continuously broadcasted in this instance, previewing is effected by displaying the still images aligned in the broadcasting sequence. Since all the still images of the scenes in the program are displayed in this way, whether or not the program is suitable for broadcasting can be precisely judged. In the case of commercial messages, for example, because all the still images of the scenes in the program are displayed, even the commercial messages having the broadcasting sequences which should be avoided as much as possible, such as the case where a commercial message to be next broadcasted uses the same background or the same personality as that of the preceding commercial passage can be previewed, too.

When the display of all the program materials inside the program gathering cannot be made in one screen, the display can be switched. For example, the display can be switched by pointing a "before" button display 61 or an "after" button display 62 displayed in the screen by the pointer (not shown).

Next, the display method which can preview the content of the program to confirm as to whether or not the program material may be broadcasted immediately before broadcasting by displaying at the portion of the still image display 26 of the next program gathering explained with reference to FIG. 1 not only by the still images but also by moving images having the same image size as that of the still image (hereinafter called the "reduced moving images") will be explained with reference to FIG. 6.

In the program broadcasting system according to the present invention shown in FIG. 5, the program material recorded on the video tape is reproduced by the VTR 1 to 3. The image signals so reproduced are inputted to the video server 5 and to the controller 6. The controller 6 stores the inputted video signals as sets of a plurality of continuous still images (frame images) in the memory device 8. In this instance, each still image is thinned out and compressed, for example, and is stored after the information quantity is decreased. At the same time, the scene change point is detected by using the technology disclosed in JP-A-4-111181, for example, and the still image number of the image relative to the detected scene change point is stored.

In this way, the information necessary for broadcasting one program material is stored. Next, the method of displaying the reduced moving images stored in this way will be explained.

When a certain program is changed immediately before broadcasting, confirmation of the program material inputted to the video server immediately before broadcasting or confirmation as to whether or not the commercial message is suitable for the program which is now on the air is made by confirming the program material to be broadcasted in the next program gathering while the program name now on the air is displayed and the present broadcasting state is confirmed, because there is no time to make the confirmation by switching the screen to the one shown in FIG. 3 or 4. In the case of the still images representative of the program shown in FIG. 1, all the contents of the program cannot be watched. Therefore, the typical image screen of the next program gathering shown in FIG. 1 is displayed by the moving images to confirm the program content.

In the system using the method of recording material data of broadcasting programs and displaying the content, a recording medium is provided to storing the procedure for implementing the method therein. The recording medium storing the procedure may be realized by various kinds of forms for example tapes, disks and semiconductor chips.

The content of the program broadcasting list which shows the program broadcasted from the video server 5 is displayed as shown in FIG. 6. In FIG. 6, reference numeral 80 denotes the display area which displays the program name, which is now on the air, among the program list. Since the program name broadcasted from the video server 5 is displayed in the display area 80, the progress of the present broadcasting can be grasped at a look. To preview the program material of the next program gathering, the screen can be switched to the representative image by selecting the "representative image screen" button of the screen shown in FIG. 6 by operating the mouse or the keyboard. At this time, the representative image screen display area 21 shown in FIG. 1 is displayed. The representative image of the next program gathering is displayed when the controller 6 reads out the material number of the next program gathering to the program gathering now on the air and the representative image number of the program material from the input information 10, finds out the still image data file having the same number as the material number, and reads the still images of the representative image number.

The reduced moving image display method selects the display portion 120 of the program material which is desired to be reproduced by the moving image from the representative image display area 21 in FIG. 1 by operating the mouse or the keyboard. Thereafter, the "reduced moving image reproduction" button 121 is selected by operating the mouse or the keyboard, and the reduced image is reproduced in the representative image display portion 120 of the next program gathering shown in FIG. 1. Reproduction of the reduced image is carried out by reading the material number of the selected program material from the input information 10, finding out the still image data file having the same name as that of the material number, reading the still images of the data file into the controller 6 and continuously displaying them.

According to the present invention, the still images representative of the image content of each scene can be displayed for each program material in the sequence of the scenes in the list form, and the series of representative still images representative of each program material and the series of still images or moving images aligned in the sequence of the scenes can be displayed in the list form in accordance with the integrated broadcasting sequence information, and confirmation of the broadcasting sequence information can be made efficiently. Therefore, it becomes unnecessary to produce the unified tape, and the troubles of producing the unified tape and confirming the broadcasting sequence, the program content and image quality of the tape by reproducing the unified tape become unnecessary.

According to the present invention, further, the representative still images of the next frame to the frame to which the program now on the air belongs can be displayed in the list form during broadcasting of the program, and a countermeasure can be taken quickly and appropriately for an emergent change of the program.

What is claimed is:

1. A method of confirming program materials to be broadcasted and then broadcasting the program materials, comprising the steps of:

storing, in a first memory device, a plurality of program materials having respective identification codes allotted thereto;

extracting, from the program materials, a plurality of representative image data representative of the program materials, the representative image data including at least one representative image data for each of the program materials;

arranging the representative image data in association with corresponding ones of the identification codes in a broadcasting sequence in which the program materials are to be broadcasted;

storing, in a second memory device, the representative image data arranged in the broadcasting sequence;

reading out, from the second memory device, the representative image data in the broadcasting sequence;

displaying, on a display, the representative image data read out from the second memory device;

confirming whether a sequence and contents of the program materials to be broadcasted in the broadcasting sequence are appropriate based on the representative image data displayed on the display;

reading out, from the first memory device, the program materials in the broadcasting sequence after the sequence and the contents of the program materials to be broadcasted in the broadcasting sequence have been confirmed as being appropriate; and broadcasting, in the broadcasting sequence, the program materials read out from the first memory device.

2. A method according to claim 1, wherein the step of displaying the representative image data includes the step of displaying, on the display, information relating to one of the program materials which is currently being broadcasted and ones of the program materials which are to be broadcasted after the one of the program materials which is currently being broadcasted.

3. A method according to claim 2, wherein in the step of displaying the representative image data, the representative image data read out from the second memory device is displayed on the display in the broadcasting sequence.

4. A method according to claim 1, wherein the step of extracting a plurality of representative image data includes the steps of:

detecting changes between scenes of each of the program materials;

extracting, from the program materials, scene representative image data representative of each of the scenes of the program materials; and designating, for each of the program materials, one of the scene representative image data representative of one of the scenes of the program material as program representative image data representative of the program material.

5. A method according to claim 4, wherein in the designating step, for each of the program materials, scene representative image data representative of a first one of the scenes of the program material is designated as the program representative image data representative of the program material.

6. A method according to claim 4, wherein the step of extracting a plurality of representative image data further includes the step of changing, for each of at least one of the program materials, the scene representative image data designated as the program representative image data to scene representative image data representative of another one of the scenes of the program material.

7. A method according to claim 4, wherein the step of displaying the representative image data includes the step of displaying, for each of at least one of the program materials, the scene representative image data of the program material in the broadcasting sequence, with the scene representative image data designated as the program representative image data being displayed in such a manner that it can be distinguished from other ones of the scene representative image data.

8. A method according to claim 1, wherein in the step of storing the representative image data in the second memory device, the representative image data is compressed before it is stored in the second memory device.

9. A method according to claim 8, further comprising the step of displaying compressed moving images corresponding to the representative image data of one of the program materials which is to be broadcasted after one of the program materials which is currently being broadcasted.

10. A recording medium having recorded therein a procedure for implementing a method of confirming program materials to be broadcasted and then broadcasting the program materials according to claim 1.

11. A system for confirming program materials to be broadcasted and then broadcasting the program materials, comprising:

an input apparatus for inputting identification codes respectively allotted to a plurality of program materials, each of the identification codes including information about a broadcasting time at which a corresponding one of the program materials is to be broadcasted;

a first memory device which stores the plurality of program materials having the identification codes respectively allotted thereto;

an extracting apparatus which extracts, from the program materials, a plurality of representative image data representative of the program materials, the representative image data including at least one representative image data for each of the program materials;

an arranging apparatus which arranges the representative image data in association with corresponding ones of the identification codes in a broadcasting sequence in which the program materials are to be broadcasted;

a second memory device which stores the representative image data arranged in the broadcasting sequence;

a first reading apparatus which reads out, from the second memory device, the representative image data in the broadcasting sequence;

a display which displays the representative image data read out from the second memory device to enable confirmation of whether a sequence and contents of the program materials to be broadcasted in the broadcasting sequence are appropriate based on the representative image data displayed on the display; and a second reading apparatus which reads out, from the first memory device, the program materials in the broadcasting sequence after the sequence and the contents of the program materials to be broadcasted in the broadcasting sequence have been confirmed as being appropriate;

wherein the program materials read out from the first memory device are broadcasted in the broadcasting sequence;

wherein the input apparatus, the extracting apparatus, the arranging apparatus, the first reading apparatus, and the second reading apparatus are constituted by a controller; and wherein the controller controls the first memory device, the second memory device, and the display.

12. A system according to claim 11, further comprising a compressing apparatus, constituted by the controller, which compresses the representative image data extracted by the extracting apparatus before the second memory device stores the representative image data.

* * * * *